Oct. 9, 1951  B. V. FINCHER ET AL  2,570,538
FISHING GAFF
Filed April 8, 1949
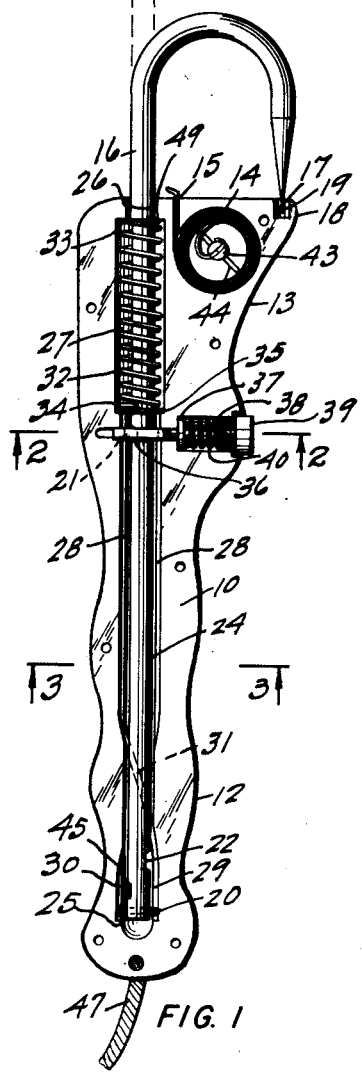
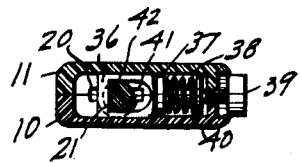
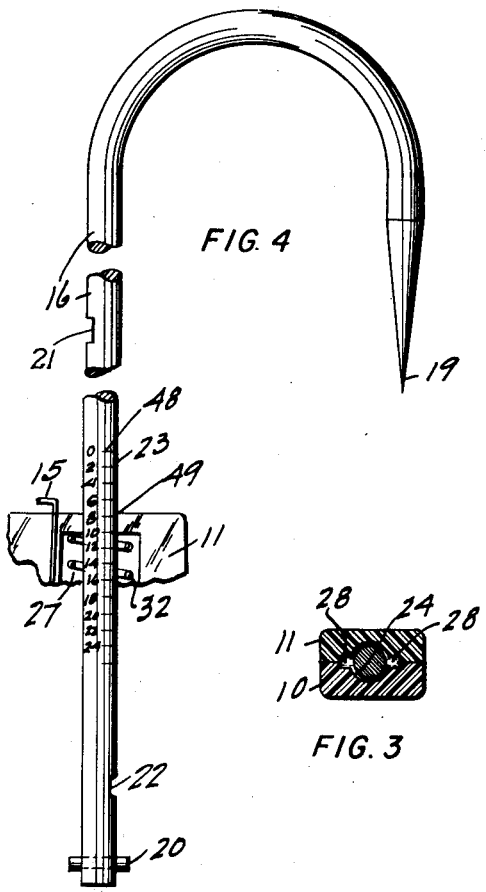
INVENTOR.
Blymer V. Fincher
Charles H. Hulett
BY
Philip A. Fredall
Attorney

Patented Oct. 9, 1951

2,570,538

UNITED STATES PATENT OFFICE 2,570,538

FISHING GAFF

Blumer V. Fincher and Charles H. Hulett, Alameda, Calif.

Application April 8, 1949, Serial No. 86,182

9 Claims. (Cl. 294—26)

This invention relates to improvements in fishing gaffs and provides a new and improved gaff which is compact and perfectly safe when not in use, and which is instantly usable by a mere casting action which projects and turns the hook and locks it in projected position, thus being automatic through a mere swing of the handle. It also provides a scale for weighing the fish while it is suspended by the hook by merely pressing a button on the handle, and in addition provides a scale for measuring the length of the fish while it is suspended on the hook, thus providing all desired information without removal of the fish from the gaff.

It also provides a fishing gaff with a weighing unit and a measuring unit, and which is practically automatic in action, of very economical manufacture, having an absolute minimum of parts, and all of which parts are of very simple form and construction.

The objects and advantages of the invention are as follows:

First, to provide a fishing gaff with a retractable hook the end or point of which is completely shielded when the gaff is not in use.

Second, to provide a fishing gaff as outlined in which the fishing gaff is placed in operation through a simple casting throw, and which causes the hook to be fully projected and simultaneously turned through an angle of 180 degrees and locked in projected position.

Third, to provide a fishing gaff as outlined with finger controlled locking and release mechanism for locking the hook in projected position.

Fourth, to provide a fishing gaff as outlined with a graduated weighing scale on the shank of the hook and which is made operative by depression of the finger controlled locking and release mechanism for further projection of the hook to couple with the weighing mechanism.

Fifth, to provide a fishing gaff as outlined with a measuring scale for measuring the length of a fish while it is suspended on the gaff.

Sixth, to provide a fishing gaff as outlined which is of the simplest possible construction, with a minimum of parts and consequently economical to construct and rapid and easy to use.

In describing the invention reference will be had to the accompanying drawings, in which:

Fig. 1 is a side elevation through the invention with one of the handle members removed to show the interior construction and details.

Fig. 2 is a section taken on line 2—2 of Fig. 1.

Fig. 3 is a section taken on line 3—3 of Fig. 1.

Fig. 4 is an enlarged broken view of the hook showing the scale graduations for weighing.

The invention consists of a pair of handle halves 10 and 11 which are complementarily formed, each having a gripping portion 12 and a head portion 13, with the head enlarged as indicated to provide a housing for the measuring scale 14 the terminal end of which projects through a passage 15 which is parallel with the axis of the hook or gaff shank 16, and a recess 17 is formed near the top edge 18 of the head to receive the point 19 to provide complete safety when the gaff is retracted as indicated.

The shank 16 has a cross-pin 20 at its inward terminal end, and has a locking notch 21 on the back for locking the gaff in retracted position and another locking notch 22 on the front near the cross-pin for locking the gaff in projected position, and a graduated scale 23 is formed near the inner end of the shank.

A bore 24 is formed between the two halves of the handle starting close to the butt end as indicated at 25 and extending through the head end at 26, and an enlarged coaxial bore 27 is formed in the head, and the main bore 24—26 has a keyway or slideway formed on each side as indicated at 27 and 28 and 29 and 30, the keyway being straight for a portion of its length with half of each keyway formed in each of the respective halves of the handle then continuing into spirals, one in each half of the handle, as indicated at 31, passing through a half turn, then continuing straight again with half in each half of the handle as indicated at 27 and 28.

A compression spring 32 is retained between the respective ends 33 and 34 of the enlarged bore 27 and a washer 35 forms a header for the spring, the spring encompassing the shank 16.

Manually releasable locking means consists of a slide 36, a washer 37 a shank 38 and finger depressable button 39, with a spring 40 urging the button outwardly, and the slide has an opening 41 to pass the shank 16 and cross-pin 20 and this opening or passage has a flat side on the side farthest from the button as indicated at 42.

A spring type measuring tape 14 is housed half in each half of the handle and has an anchor 43 anchored in the respective halves of the handle as indicated at 44.

When the hook or gaff is retracted, the point extends within the socket 17, and the locking slide 36 has its flat portion 42 urged into the recess 21 formed in the back of the shank, the spring 40 urging the slide to lock the gaff in the retracted position. To project the gaff, the handle is gripped with the thumb depressing the button 39; the device is given a sudden swing forward and downward causing the gaff to project forwardly, the hook projecting straight forward while the cross-pin 20 moves forward to the point 45 at which time the point 19 of the hook will have completely cleared the recess and head; further movement causing the cross-pin to follow the spiral through 180 degrees and turn the hook to the dotted position 46, then continuing straight toward the lock, the thumb having automatically released the button during the quick downward swing, since a quick downward swing could not be made if a specific attempt was made to keep the button depressed. This releases the lock and it locks in the slot 22, locking the gaff in projected position ready for use.

Having gaffed the fish, the fish and gaff may be suspended by the handle or by the belt cord 47, the button depressed which releases the gaff and the gaff drops down until the cross-pin 20 rests on the washer 35, the weight pulling against the spring tension with the shank 16 projecting down further as the spring is depressed by the load, at which time the weight can be read on the scale 23, the 0 point 48 being in registry with the end 49 of the head under no load. After the fish is weighed and removed from the gaff, the spring 32 retracts the gaff sufficiently so that the lock again engages in the slot 22 if the gaff is permitted to snap back. Otherwise a slight push on the hook will return the gaff to its normal projected position. The measuring tape 14 can be used to measure the length of the fish while it is suspended by the gaff.

To retract the gaff it is merely necessary to depress the button 39 and push the gaff back into the handle, the gaff automatically turning when it reaches the spiral, and when the point 19 enters the recess 17, the lock automatically is again in its retracted position. It will be noted that this gaff has a very small number of parts for all of the operations which it is capable of performing, numbering only twelve not including the means for securing the handle halves together, yet it is capable of instant projection with automatic turning of the hook, automatic locking in either retracted or projected position, weighing and measuring the fish without removal from the gaff, and has complete protection against the point of the hook; is light, and easily carried while always being ready for instant use.

We claim:

1. A fishing gaff comprising; a handle provided with a longitudinal bore, and a gaff having a shank retractable into and projectable from said bore; manually releasable means for locking said gaff in retracted and projected positions, and means for angularly adjusting said gaff during projecting and retracting movements; said shank being slidable in said bore; said manually releasable means comprising two recesses formed in spaced relation in the respective sides of the shank, and a spring retracted slide member operating transversely to the axis of said shank and having a button for thumb depression of the slide, with the slide engaging in the respective recesses when the gaff is projected and retracted.

2. A fishing gaff comprising; a handle provided with a longitudinal bore, and a gaff having a shank retractable into and projectable from said bore; manually releasable means for locking said gaff in retracted and projected positions, and means for angularly adjusting said gaff during projecting and retracting movements; a spring housed in said handle and surrounding said shank with said shank engaging said spring to provide weighing means when said manually releasable means is actuated to release the gaff when in normal projected position, and scale graduations on said shank registrable with one end of the handle for determination of the weight of the fish.

3. A fishing gaff comprising; a handle provided with a longitudinal bore, and a gaff having a shank retractable into and projectable from said bore; manually releasable means for locking said gaff in retracted and projected positions, and means for angularly adjusting said gaff during projecting and retracting movements; a bore formed longitudinally in said handle, said shank being slidable in said bore; said manually releasable means comprising two recesses formed in spaced relation in the respective sides of the shank, and a spring retracted slide member operating transversely to the axis of said shank and having a buttom for thumb depression of the slide, with the slide engaging in the respective recesses when the gaff is projected and retracted; said means for angularly adjusting said gaff comprising a cross-pin in the inner terminal end of said shank and operating slidably in said bore, said handle having a pair of oppositely disposed keyways formed therein and communicating with said bore, the opposite end portions of each of said keyways being straight and the portions thereof between said end portions being spiral in form, the corresponding end portions of said cross pin lying within said keyways and acting to rotate said gaff through an angle of 180 degrees relative to the handle as said pin moves longitudinally of said keyways from end to end thereof.

4. A fishing gaff comprising; a handle provided with a longitudinal bore, and a gaff having a shank retractable into and projectable from said bore; manually releasable means for locking said gaff in retracted and projected positions, and means for angularly adjusting said gaff during projecting and retracting movements; a bore formed longitudinally in said handle, said shank being slidable in said bore; said manually releasable means comprising two recesses formed in spaced relation in the respective sides of the shank, and a spring retracted slide member operating transversely to the axis of said shank and having a button for thumb depression of the slide, with the slide engaging in the respective recesses when the gaff is projected and retracted; a spring housed in said handle and surrounding said shank with said shank engaging said spring to provide weighing means when said manually releasable means is actuated to release the gaff when in normal projected position, and scale graduations on said shank registrable with one end of the handle for determination of the weight of the fish.

5. A fishing gaff comprising; a handle provided with a longitudinal bore, and a gaff having a shank retractable into and projectable from said bore; manually releasable means for locking said gaff in retracted and projected positions, and means for angularly adjusting said gaff during projecting and retracting movements; said means for angularly adjusting said gaff comprising a cross-pin in the inner terminal end of said shank and operating slidably in said bore, said handle having a pair of oppositely disposed keyways formed therein and communicating with said bore, the opposite end portions of each of said keyways being straight and the portions thereof between said end portions being spiral in form, the corresponding end portions of said cross pin lying within said keyways and acting to rotate said gaff through an angle of 180 degrees relative to the handle as said pin moves longitudinally of said keyways from end to end thereof; a spring housed in said handle and surrounding said shank with said shank engaging said spring to provide weighing means when said manually releasable means is actuated to release the gaff when in normal projected position, and scale graduations on said shank registrable with one end of the handle for determination of the weight of the fish.

6. A fishing gaff comprising; a handle provided with a longitudinal bore, and a gaff having a shank retractable into and projectable from said bore; manually releasable means for locking said gaff in retracted and projected positions, and means for angularly adjusting said gaff during projecting and retracting movements; said manually releasable means comprising two recesses formed in spaced relation in the respective sides of the shank, and a spring retracted slide member operating transversely to the axis of said shank and having a button for thumb depression of the slide, with the slide engaging in the respective recesses when the gaff is projected and retracted; said means for angularly adjusting said gaff comprising a cross-pin in the inner terminal end of said shank and operating slidably in said bore, said handle having a pair of oppositely disposed keyways formed therein and communicating with said bore, the opposite end portions of each of said keyways being straight and the portions thereof between said end portions being spiral in form, the corresponding end portions of said cross pin lying within said keyways and acting to rotate said gaff through an angle of 180 degrees relative to the handle as said cross pin moves longitudinally of said keyways from end to end thereof; a spring housed in said handle and surrounding said shank with said shank engaging said spring to provide weighing means when said manually releasable means is actuated to release the gaff when in normal projected position, and scale graduations on said shank registrable with one end of the handle for determination of the weight of the fish.

7. A fishing gaff comprising a handle formed of identical complementary halves and secured together and having a head end; said handle having a longitudinal bore formed from said head end throughout the major portion of the length of the handle, and having keyways formed in said handle from respective sides of the walls of said bore and formed straight at both ends with the intermediate portion spiraling through 180 degrees; a gaff having a shank slidable in said bore and a cross-pin in the inner terminal end of said shank and having projecting ends slidable in said keyways, manually releasable means for locking said gaff in respective projected and retracted positions, whereby upon actuation of said manually releasable means and downward casting of the handle, the gaff is projected and automatically turned through an angle of 180 degrees for use.

8. A structure as defined in claim 7; a spring housed in said handle and surrounding said shank with said shank engaging said spring to provide weighing means when said manually releasable means is actuated to release the gaff to normal projected position, and scale graduations on said shank registrable with the end of the head of the handle for determination of the weight of the fish.

9. A fishing gaff comprising, a handle provided with a longitudinal bore, and a gaff having a shank retractable into and projectable from said bore; manually releasable means for locking said gaff in retracted and projected positions, and means for angularly adjusting said gaff during projecting and retracting movements, said means for angularly adjusting said gaff comprising a cross pin in the inner terminal end of said shank and operating slidably in said bore, said handle having a pair of oppositely disposed keyways formed therein and communicating with said bore, the opposite end portions of each of said keyways being straight and the portions thereof between said end portions being spiral in form, the corresponding end portions of said cross pin lying within said keyways and acting to rotate said gaff through an angle of 180 degrees relative to the handle as said pin moves longitudinally of said keyways from end to end thereof.

BLUMER V. FINCHER.
CHARLES H. HULETT.

REFERENCES CITED

The following references are of record in the file of this patent:

UNITED STATES PATENTS

| Number | Name | Date |
| --- | --- | --- |
| D. 152,595 | Cederblad | Feb. 8, 1949 |
| 452,278 | McIlvaine | May 12, 1891 |
| 528,731 | Morrison | Nov. 6, 1894 |
| 698,370 | Burrows | Apr. 22, 1902 |
| 2,372,743 | Schofield | Apr. 3, 1945 |
| 2,446,720 | Rominski | Aug. 10, 1948 |

FOREIGN PATENTS

| Number | Country | Date |
| --- | --- | --- |
| 17,868 | Great Britain | 1906 |